US005503849A

United States Patent [19]

Bilodeau

[11] Patent Number: 5,503,849

[45] Date of Patent: Apr. 2, 1996

[54] CONDUCTIVE BASE SHEETS UTILIZING CONDUCTIVE BENTONITE CLAYS IN THE FIBER MATRIX

[75] Inventor: Wayne L. Bilodeau, Farmington, Me.

[73] Assignee: Otis Specialty Papers Inc., Jay, Me.

[21] Appl. No.: 935,249

[22] Filed: Aug. 27, 1992

[51] Int. Cl.[6] .......... B32B 9/04

[52] U.S. Cl. .......... 428/448; 428/451; 428/454; 428/511; 428/537.5

[58] Field of Search .......... 162/164.6, 168.2, 162/168.3, 181.8, 537.5; 428/537.5, 451, 454, 511, 448

[56] References Cited

U.S. PATENT DOCUMENTS

| | | | |
|---|---|---|---|
| 3,052,595 | 9/1962 | Pye | 162/164 |
| 4,336,306 | 6/1982 | Fellows | 428/341 |
| 4,372,814 | 2/1983 | Johnstone et al. | 162/124 |
| 4,739,003 | 4/1988 | Barr et al. | 524/446 |
| 5,126,014 | 6/1992 | Chung | 162/164.6 |
| 5,221,435 | 6/1993 | Smith, Jr. | 162/164.1 |

*Primary Examiner*—Christopher W. Raimund
*Attorney, Agent, or Firm*—Burns, Doane, Swecker and Mathis

[57] ABSTRACT

Provided is a conductivized cellulosic sheet material and a method for making the same. The conductivized sheet material comprises a fibrous matrix of cellulosic material and conductive clay intimately and uniformly dispersed throughout the cross-sectional thickness of the fibrous matrix. Such a conductivized sheet exhibits advantageously low volume and surface resistivities at high and low relative humidities.

4 Claims, No Drawings

CONDUCTIVE BASE SHEETS UTILIZING CONDUCTIVE BENTONITE CLAYS IN THE FIBER MATRIX

This invention relates to conductivized sheets of cellulosic fiber and the process for their manufacture. More particularly, the conductivized sheets, according to the present invention, contain conductive clays that are uniformly dispersed through the cross-sectional thickness of the sheet.

In the past, conductive sheet materials, such as conductive paper and conductive packaging, have been rendered conductive by incorporating conductive materials in the sheet material or by coating the sheet with a film of conductive material. However, the conductive materials suitable for use in both types of conductive sheets are limited.

In particular, the rheological properties of a conductive filler material to be incorporated into the sheet material must be sufficient to allow thorough or complete dispersion in water. This will allow the requisite amount of conductive filler to be incorporated in the cellulosic pulp, yielding a sheet material of sufficient conductivity. In the past, various types of conductive materials have been utilized as fillers in conductive sheet material.

For example, in U.S. Pat. No. 2,328,198, finely divided Paris black, otherwise known as carbon black, and finely divided metals are described as being suitable for incorporation in paper. The finely divided carbon black is added to water to form a colloidal solution. This solution is then mixed in a beater with a batch of fibrous stock and beaten until a pulp is formed. Paper sheets are then formed using conventional paper making techniques from the resulting fibrous pulp. See also U.S. Pat. No. 3,149,023, wherein carbon or graphite is incorporated into the paper in order to render the sheet conductive.

Other conductive fillers have also been incorporated in the fibrous matrix of paper sheets. In U.S. Pat. No. 3,062,700, there is disclosed static discharging paper containing conductive white zinc oxide or white titanium dioxide powder. Zeolites have also been employed as conductive fillers. See U.S. Pat. No. 3,694,202.

Filler retention aids or sizing agents have also been utilized in the manufacture of conductive papers, such as polyacrylamide resins, alum or aluminum sulphate. See, for example, U.S. Pat. No. 2,328,198. Very small amounts of the retention aids are normally added prior to the sheet forming process. Modified clays have also been used generally as a retention aid. In the case of such clays, the amount of modified clay added is generally less than 1% by weight of the cellulosic pulp.

Conductive clays have generally not been incorporated in the fibrous matrix of sheet materials for the purpose of creating a conductive medium due to the low quality of sheets produced. Such clays are not readily dispersed in mixers which cause lumping in the beater/headbox yielding clay lumps in the pulp and in the resulting sheet material. Moreover, there is great difficulty retaining the clay in the fibrous matrix. Accordingly, the conductivity of the sheet material produced is inadequate for application in the conductive paper industry.

Conventionally, a conductive filler is incorporated in the paper in amounts of less than 10% by weight of dry paper. Higher filler amounts have been found to adversely affect the strength of the paper. In general, the above-mentioned conventional, conductive agents provided in a paper matrix as filler have not been found adequate electroconductive agents due to 1) low filler retention, 2) increased raw material costs and/or 3) increased volume resistivity.

The second type of conductive sheet material produced in prior art processes utilizes a conductive coating on the paper base. This coating is applied subsequent to formation of the paper sheet. As a result, the volume resistivity of the inner portion of the sheet will not be reduced, i.e., the volume conductivity, which is inversely proportional to the resistivity, has not been sufficiently increased thereby resulting in insufficient paper conductivity. Additionally, coatings are more susceptible to peeling, cracking or being rubbed off. This reduces the overall effective lifetime of the paper.

Such coatings include clays. When clay is utilized as a coating, the difficulties of incorporating the clay into the paper fibrous matrix are obviated.

Initially, clay coatings were used only as "loading" or "sizing" material in the manufacture of conventional, non-conductive paper for the purpose of improving the "finish" of the paper. However, some clays have been applied to paper surfaces as coatings to render the paper conductive.

In U.S. Pat. No. 3,330,691, attapulgite clay is coated on paper webs to manufacture recording material. Due to the rheological properties of these clays, care must be taken to reduce build-up that normally occurs in the coating pond.

Other types of clays have been used to fabricate conductive paper. For example, montmorillonite clays have been successfully coated on paper to provide conductivity. See U.S. Pat. No. 3,653,894. Usually binders and polymers are added to the clay coatings. See U.S. Pat. Nos. 4,389,451; 3,884,685; 3,861,954; 3,653,894; and 3,293,115.

Several other conductive agents have been developed in the industry. In particular, a humectant, such as glycerine or glycol, may be coated on the paper. At low ranges of humidities, satisfactory conductivity is obtained. However, at high ranges of humidities, the conductivity is generally much higher than needed and tends to cause electrical problems. Furthermore, at high humidities, the sheet tends to become wet and extremely limp. Hydroscopic salts, such as lithium chloride, have been proposed as conducting vehicles and while they give somewhat better results than humectants, they are also subject to similar disadvantages. Water soluble conductive polymers have also been proposed, such as polymerized vinylbenzyl trimethyl ammonium chloride. These conductors provide advantages over previous substances, but suffer from the disadvantage of relatively high cost. Accordingly, none of the above-mentioned conducting agents are suitable for the manufacture of conductive paper.

Certain clays have been incorporated in inorganic paper-like products, such as millboard. In U.S. Pat. Nos. 2,493,604, 2,695,549 and 3,096,200, paper-like products are described consisting preponderantly of asbestos fibers, on the fibers of which a modified agglomerated clay has been deposited. However, the clay is treated in such a fashion that it imparts no conductivity to the resulting product. In fact, the product is insulating in nature.

Montmorillonite clay particulates have also been utilized in synthetic linear polyamide fabrics, such as nylon, for the purpose of preventing static charge build-up. See U.S. Pat. No. 3,063,784. The linear polyamides are unique in that they contain carboxyl oxygen groups that, upon treatment with acid, have the ability to absorb hydrogen ions. This activates the terminal amino groups of the polyamide fibers, causing them to assume a positive charge, which terminal amino groups then react with the clay particles. However, natural cellulosic materials, such as paper, do not have such ability to react with clays and bind them to the fibrous structure.

Conductive papers find useful application in electrophotography. Conventionally, electrostatic recording processes use a recording material comprising an electroconductive base sheet and a recording layer formed on the base sheet composed mainly of insulating resin. With these processes, voltage pulses are applied directly to the front, back or both sides of the recording layer. Electrostatic latent images found on a plate are transferred onto the recording layer to form electrostatic latent images on the recording layer and the latent images are converted to visible images with a coloring powder, such as toner. Initially, the latent images are transformed to the recording layer vis-a-vis voltage pulses applied to pin electrodes on the front of the recording layer. Newer systems apply voltage pulses separately to front side pin electrodes and to subelectrodes or back electrodes. To obtain satisfactory recording images, the electrostatic recording material must have reduced impedance. Usually the electroconductive base sheet has a surface electrical resistivity of $10^6$ to $10^9$ ohms at ambient humidity. Resistivities greater than $10^{10}$ ohms result in a significantly reduced image density and resistivities greater than $10^{11}$ ohms yield little or no recorded image. Electrostatic recording processes are widely used for facsimile systems, printers and copiers.

At lower humidities, conventional electroconductive base sheets display increased resistivity. This is due, in part, to the particular electroconductive agent used for rendering the sheets conductive. Normally such agents are high-molecular weight electrolytes that rely on ionization for their conductivity. See U.S. Pat. No. 3,861,954. As the humidity lowers, the conductive base sheet has a reduced water content, thereby yielding a decreased amount of disassociated ions and thus an increased resistivity.

More recently, other electroconductive agents have been discovered which are not as dependent on moisture for conductivity potential. For example, zinc oxide powder, indium oxide powder or tin oxide powder, applied as coatings on paper, provide increased image density at low humidities. However, at high humidities, such powders yield lower image densities. Accordingly, a combination of inorganic conductive powders and salts of copolymers of acrylic acid or methacrylic acid in a single electroconductive layer have been utilized as electroconductive recording layers. See U.S. Pat. No. 4,389,451.

Additional efforts have been employed in the industry to incorporate clays in electroconductive coatings. In U.S. Pat. No. 3,639,162, metallic bentonites are employed as conductive coatings on paper for electroconductive recording materials.

There are several disadvantages to electroconductive recording materials relying solely on a coating of conductive material: 1) total volume conductivities may be insufficient when coatings are utilized, 2) coatings may rub off or peel off after periods of use, and 3) coatings require additional processing and thus result in additional expense.

Although many different conductive materials have been investigated for possible use in various conductive sheet applications, and in particular electroconductive recording materials, a suitable conductive material which can be incorporated into the fibrous matrix of sheet material while maintaining adequate sheet quality, has yet to be provided. Such a conductive material, would be readily accepted and would fill the existing void in the conductive sheet market place. The search for improved conductive sheet material is ongoing.

Accordingly, it is an object of the present invention to provide a novel conductive sheet material which incorporates conductive clay material into the fibrous matrix of sheet material while maintaining adequate sheet quality and conductivity.

It is yet another object of the present invention to provide a conductive sheet material which displays sufficiently low volume and surface resistivities at high and low relative humidities.

It is another object of the present invention to provide a conductive sheet material in which no conductive coatings are necessary to render the sheet material adequately conductive for use as antistatic paper and packaging materials.

It is still another object of the invention to provide a conductive sheet material that is of sufficient strength and conductivity while being inexpensively and easily manufactured.

It is also an object of the present invention to provide a conductive sheet material which is suitable for use in the conductive paper industry, the conductive packaging industry and the electrostatic paper industry.

It is yet another object of the present invention to provide an electrostatic recording material comprised of a conductivized clay sheet.

These and other objects, as well as the scope, nature and utilization of the invention, will be apparent to those skilled in the art from the foregoing description and the appended claims.

SUMMARY OF THE INVENTION

In accordance with the foregoing objectives, provided hereby is a novel conductive sheet material. The conductive sheet of the present invention comprises a fibrous matrix of cellulosic material and conductive clay intimately and uniformly dispersed throughout the fibrous matrix. The sheet is of a uniform, good quality. Preferably, bentonite clays are employed as the conductive clay filler, which preferably are present in the fibrous matrix in an amount of from about 5% to about 30% by weight of dry fibrous cellulosic material.

The conductivized sheet of the present invention is produced by providing a fibrous cellulosic material in the form of raw stock of papermaking length or in the form of a pulp and then adding to this mixture the conductive clay. Small amounts of a cationic coagulant, and preferably also a flocculent, are then also added to the solution. Subsequently, a conductivized sheet of cellulosic material is formed by applying the pulp to a wire screen and dewatering the pulp. Then the applied pulp is calendared to form sheets of conductive materials.

According to one embodiment of the invention the conductive sheets can be utilized in electrostatic recording materials. For example, an electrostatic recording material in accordance with the present invention includes an electroconductive base sheet with a dielectric coating on one side of the base sheet and a conductive polymeric coating on the opposite side of the base sheet. The base sheet is comprised of a fibrous matrix of cellulosic material and conductive clay intimately and uniformly dispersed throughout the cross-sectional thickness of the fibrous matrix, which base sheet has been prepared by the process of the present invention.

DETAILED DESCRIPTION OF THE PREFERRED EMBODIMENTS

The conductive sheet materials of the present invention can be manufactured by utilizing finely divided conductive clay particles which are intimately and uniformly dispersed with fibers of papermaking length in water to provide a homogenous slurry. The conductive clay can be added prior to beating the cellulosic fibers or after a cellulosic pulp is formed. The aqueous slurry is then fed to a headbox of a papermaking machine. A cationic coagulant and preferably also a flocculent can be added at this time or at any time prior to the sheet formation to increase fiber retention and increase drainage of the cellulosic fibrous pulp during subsequent web formation.

After the pulp and slurry is thoroughly mixed to a point where the clay is intimately and uniformly present in the pulp, the mixture is deposited in a uniform manner upon a screen where the liquid is removed and a web is formed. The web is then dried and may be treated in accordance with conventional papermaking practice, such as calendaring. For use as a conductive sheet, the web may be further subjected to subsequent coating as will be described in detail hereinafter.

The pH of the aqueous dispersion in the headbox can vary, but is generally maintained in the range of about 6.0–9.0 and preferably in the range of about 7.0–8.5. This is most conveniently done by use of alkaline agents which will not materially affect the properties of the conductive clay, such as soda ash. A sizing agent may be added to make the paper less absorbent or porous, to give good surface smoothness and to impart the desired degree of stiffness. It fills up the pores between the fibers and gives a finer texture. Many different sizing agents can be utilized. However, it is preferable to use alkyl ketene dimers which are added directly to the dispersion in the headbox.

Various fibers and admixtures of fibers may be employed in the present invention including natural cellulosic fibers such as manila hemp, jute, bleached or unbleached kraft, coria, sisal, eucalyptus and sulfite pulps. Synthetic fibers such as viscose and acetate rayon, polyamide, vinyl acetate-vinyl chloride copolymer and polyester; and inorganic fibers such as glass, quartz and ceramic may also be added to the fiber admixture. It is preferred, however, that the amount of cellulosic fibers employed be in the range of from 70 to 100 weight percent of the total fibers employed.

Natural cellulosic fibers are preferable for most applications in that no binders are necessary to provide strength to the sheet. In addition, such fibers are desirable because they possess a relatively low dielectric constant. If so desired, however, a small amount of an added binder material may also be incorporated in the fibrous matrix to enhance the bond formed by the cellulosic material.

Synthetic organic fibers and inorganic fibers may be desirable for applications where resistance to high temperatures or corrosive conditions is necessary. The synthetic and inorganic fibers may also be admixed with each other and may be used singly or jointly in combination with natural cellulosic fibers to provide sheets having advantageous features of such an admixture.

Generally, when the fibrous component of the sheet is comprised of synthetic and/or inorganic fibers, it is necessary to employ a binding agent, such as highly beaten coria flock or colloidal silica.

The fibers are preferably of papermaking length, i.e., predominately of about 1/32 inch to 3/8 inch and the synthetic or inorganic fibers may even be longer than 1 inch depending upon the dispersability of the fibers to provide an aqueous slurry. The synthetic and inorganic fibers are unhydrated but the natural cellulosic fibers may be beaten and hydrated, particularly for increasing the strength of the sheet.

Different conductive clays, such as bentonite, vermiculite, pyrophylite and attapulgite clays can be suitable for use in the present invention. However, bentonite clays are the most preferable due to their physical and electric characteristics. Examples of suitable bentonite clays include sodium, lithium, calcium, ferric and chromic bentonites (and montmorillonites), with sodium bentonite being the most preferred. The conductive clays are preferably in the form of a finely divided powder having a particle size of less than about 150 mesh and preferably of less than about 200 mesh.

The clay content in the conductive sheet may be varied over a wide range, but generally ranges up to 40% by weight of the dry conductive sheet. Amounts in excess of 40% may reduce the strength of the sheet to an unacceptable point. Preferably, the clay content should be within the range of from about 5% to about 30% by weight of the dry conductive sheet.

The conductive clay can be introduced prior to the sheet forming process in any suitable form, whether powder or in solution. Good results have been obtained by adding the conductive clay in powder or particulate form. The conductive clay can be added to the fibrous rawstock, i.e., prior to beating the rawstock, or the clay can be added after a pulp has been formed. However, it is preferable to add the clay during the beating process so that the clay will be intimately and uniformly mixed throughout the pulp.

In addition to the conductive clay, a cationic coagulant is combined with the ingredients prior to the sheet forming process. The cationic coagulant is needed to shift the total charge of the dispersion in the headbox to levels necessary for papermaking. Certain conductive clays, especially bentonite clays, are highly negative in nature which yields a very anionic dispersion. Therefore, the fiber and the clay particles in the dispersion strongly repel one another. This makes it extremely difficult to retain the clay particles in the pulp. Accordingly, the water system will become very rich in negatively charged clay particles. As a result, the total charge of the papermaking system will not be stable and poor quality sheets will be produced.

Therefore, an amount of coagulant sufficient to neutralize the anionic dispersion, or at least to shift the charge sufficiently to permit good coagulation and hence good sheet formation, must be added to the headbox or anytime prior to sheet formation. This eliminates the repelling forces in the dispersion and allows the fibers and clay particles to closely approach each other. Accordingly, an increased quantity of clay will be retained in the pulp sufficient to yield conductive sheets, and good sheet formation and drainage will be achieved.

Generally the cationic coagulant should be present in the pulp and clay dispersion in an amount of from about 0.20% to about 2.0% by weight of the solids content of the pulp and clay dispersion, and most preferably from about 0.5%. It is important, however, that the amount is sufficient to neutralize or at least sufficiently shift the charge of the bentonite clays.

There are several cationic coagulants that are suitable for the purposes of the present invention and that do not interfere with the electrical properties of the conductive clay. Such preferred cationic coagulants as represented by low molecular weight cationic polymers, such as the poly(acrylamide) class of resins, are the most preferable coagulants. Suitable commercial coagulants are available under the trademarks NALCO 7607 and CYDRAIN 26.

It is also preferred to include a flocculent, which increases the conductive clay retention in the fibrous matrix, preferably to at least 70%, and most preferably above 90%. The flocculent can be incorporated into the pulp at any time prior to sheet formation. The flocculent may be admixed with other solutions being added to the pulp, such as the coagulant solution. However, it is preferable to add the flocculent separately in the form of a colloidal solution.

The flocculent should be added in an amount of from about 0.1% to about 1.0% by weight of the solid content of the clay and fiber pulp dispersion. Preferably, about 0.1% to about 0.5% by weight of the clay and pulp solids content provides optimum strength and clay retention in the sheet.

It has been found that anionic, nonionic or cationic flocculents all provide the desired retention activity without interfering with the properties of the conductive clay. According to the invention, an anionic flocculent is most preferred, such as those of (polyacrylamide) type polymers. Suitable commercial flocculents are available under the trademarks NALCO 623-sc; ACCURAC 129, 130 and 135; and PERCOL 351 and 175, 155.

After the desired amounts of clay, cationic coagulant, and preferably flocculent, are added to the pulp, the slurry dispersion is further beaten until the particulates are thoroughly and uniformly mixed throughout the pulp.

Even though the flocculent and coagulant may be admixed together prior to addition of the pulp, it is preferable to introduce the coagulant in its own colloidal solution separately. Moreover, it is preferred that the coagulant be added to the pulp a very short time before the pulp is deposited on the wire screen.

Although cylinder machines may be employed, the sheet is most desirably formed in Fourdrinier papermaking machines. Any conventional Fourdrinier machine may be employed which yields uniformity in the sheet structure. In such Fourdrinier machines, the pulp or slurry dispersion is generally maintained at about 0.1% to about 1.0% by weight solids and preferably about 0.2% to about 0.7% for optimum results. Higher consistencies may be readily employed on cylinder and conventional Fourdrinier machines.

Subsequent to the deposition of pulp on the wire screen, a majority of the water in the pulp is removed by conventional suction devices located below the screen. Then the formed sheets are dried according to well known techniques. Subsequently, the dried sheet is subjected to a calendaring process, wherein the sheet is compacted between rollers at high pressure. This provides the sheet with the proper surface characteristics.

It should also be noted that a conductive polymer coating may be applied to one or both sides of the sheet material to further improve the sheet conductivity, if necessary. This coating can be applied prior to or subsequent to the calendaring operation. Typically, polydimethyl diallyl ammonium chloride polymers are used and are available under the trade names Agestat 41T, Makroville 69L, Chemistat, Alcostat or Calgon 261. However, conductive coatings based on conductive materials such as zinc oxide, tin oxide, bentonite and surface modified clays, under the tradenames Bentalite H or Polarite, are also suitable.

The conductivized sheet displays advantageous qualities, especially with respect to resistivity. For example, volume resistivities of uncoated sheets can range from about $10^6$ ohms/sq. to about $10^8$ ohms/sq. at a relative humidity of about 50%. Surface resistivities of the uncoated sheets according to the present invention can range from about $10^6$ ohms/sq to about $10^{10}$ ohms/sq at 50% relative humidity.

The following examples are given to more fully illustrate specific embodiments of the invention. The examples are given for illustrative purposes only and are not intended to be limiting on the scope of the invention.

EXAMPLE 1

880 lbs of softwood kraft pulp, 880 lbs of eucalyptus pulp and 440 lbs of broke pulp (a secondary pulp) were mixed and beaten to 350 csf (Canadian Standard Freeness). To the beaten pulp mixture was added 20 lbs of talc, 20 lbs of sodium bicarbonate, 300 lbs of sodium bentonite and dyes, and 5 lbs of soda ash to adjust the pH to within the range of 7.5–8.0.

The resulting pulp/clay mixture was then pumped to a Fourdrinier machine, with 9 lbs/ton of a cationic coagulant (NALCO 7607) and 5 lbs/ton of a flocculent (NALCO 623-sc) being added thereto, along with 2 ½ lbs/ton of a sizing agent and about 2 lbs/ton of a defoamer, prior to sheet formation. The slurry is then mixed and passed into the wire screen of the Fourdrinier machine, and subsequently dewatered to form a conductive base sheet.

The conductive base sheet was then dried on commercial drier cans to a moisture content of about 2 ½%. The sheet was then coated on both sides using a roll coater with a quaternary ammonium polymer-based conductive coating. The coated sheet was dried to a sheet moisture of 5.5%.

The conductive sheet was observed to be of good formation and had the following characteristics:

| | |
|---|---|
| Base wt.: | 40.1 lb/3000 sq. ft |
| Caliper: | 2.91 mils |
| Felt side - Surface Resistivity 50% RH | $18 \times 10^6$ ohms/sq. |
| Wire side - Surface Resistivity 50% RH | $17 \times 10^6$ ohms/sq |
| Felt side - Surface Resistivity 20% RH | $210 \times 10^6$ ohms/sq |
| Wire side - Surface Resistivity 20% RH | $210 \times 10^6$ ohms/sq |
| Volume Resistivity 50% RH | $1.5 \times 10^5$ ohms/sq. |

EXAMPLE 2

The procedure of Example 1 was repeated, except the eucalyptus was replaced with 880 lbs of hardwood kraft, and the pulp slurry was beaten to a freeness of 320 csf.

The conductive sheet was observed to be of good formation and had the following characteristic:

| | |
|---|---|
| Base wt.: | 40 lb/3000 sq. ft |
| Caliper: | 2.8 mils |
| Felt Side - Surface Resistivity 50% RH | $11 \times 10^6$ ohms/sq. |
| Wire Side - Surface Resistivity 50% RH | $12 \times 10^6$ ohms/sq |
| Felt Side - Surface Resistivity 20% RH | $150 \times 10^6$ ohms/sq |
| Wire Side - Surface Resistivity 20% RH | $150 \times 10^6$ ohms/sq |

EXAMPLE 3

The procedure of Example 2 was repeated. The conductive sheet was observed to be of good formation and had the following characteristics:

| | |
|---|---|
| Base wt.: | 40 lb/3000 sq. ft |
| Caliper: | 2.7 mils |
| Felt Side - Surface Resistivity 50% RH | $15 \times 10^6$ ohms/sq. |
| Wire Side - Surface Resistivity 50% RH | $13 \times 10^6$ ohms/sq. |
| Felt Side - Surface Resistivity 20% RH | $150 \times 10^6$ ohms/sq |
| Wire Side - Surface Resistivity 20% RH | $150 \times 10^6$ ohms/sq |

EXAMPLE 4

The procedure of Example 1 was repeated, except the pulp slurry was beaten to a freeness of 320 csf. The conductive sheet was observed to be of good formation and had the following characteristics:

| | |
|---|---|
| Base wt.: | 39.9 lb/300 sq. ft |
| Caliper: | 2.621 mils |
| Felt Side - Surface Resistivity 50% RH | $20 \times 10^6$ ohms/sq. |
| Wire Side - Surface Resistivity 50% RH | $20 \times 10^6$ ohms/sq |
| Felt Side - Surface Resistivity 20% RH | $270 \times 10^6$ ohms/sq |
| Wire Side - Surface Resistivity 20% RH | $230 \times 10^6$ ohms/sq |

The conductivized sheet of the present invention is very suitable for application in the area of electrostatic recording materials. In particular, the conductive clay sheets of the present invention can be employed as a base conductive sheet with conductive layers being coated on one side or both sides of the base sheet. The conductive layers include conductive polymers or conductive minerals, such as bentonite clay. Subsequently, a solvent based dielectric layer may be coated on one side of the sheet. Additionally, more than one conductive layer may be coated on a single side of the base sheet.

Suitable solvent based dielectric films according to the invention include acrylic dispersions of sufficient dielectric strength and being free of conducting species. Additionally, acrylic polymers of amine salt are also suitable. Such acid polymer films are formed by application of the mixture to the base sheet with subsequent drying which causes only the acid polymer to remain on the sheet.

There are numerous conductive films that are adequate for the backside conductive coating. Such films should be composed of material having sufficient optical quality so as not to degrade image contrast. For example, clear films of conductive polymers can be used. In addition, any conductive pigment based film is suitable, such as bentonites, zinc oxides, tin oxides, synthetic clays and conductive surface segments.

The thickness of the films may be of any value as long as the coating or film renders total conductivity sufficient to effect the desired quality of dielectric imaging.

The electrostatic recording materials thus prepared according to the present invention provide images at a high density, satisfactory levels of grain and mottle, and low levels of defects such as glitches and voids. The material also exhibits high stability at low or high relative humidities. All of these advantages are made possible due to the surprisingly easy yet excellent sheet formation of the conductive base of the present invention, using conventional papermaking machines.

While the invention has been described in terms of preferred embodiments, it is to be understood by those skilled in the art that various changes may be made and equivalents may be substituted for elements thereof without departing from the true spirit and scope of the invention. In addition, many modifications may be made to adopt a particular situation or material to the teaching of the invention and are considered to be within the purview and the scope of the claims appended hereto.

What is claimed:

1. An electrostatic recording material comprising an electroconductive base sheet, a dielectric coating on one side of said base sheet and a conductive coating on the opposite side of said base sheet, said electroconductive base sheet comprised of a fibrous matrix of cellulosic material, a cationic coagulant and bentonite clay intimately and uniformly dispersed throughout the cross sectional thickness of said fibrous matrix, with the amount of bentonite clay present in said electroconductive base sheet being in the range of from about 5% to about 30% by weight of dry fibrous cellulosic material, and the amount of cationic coagulant present in said electroconductive base sheet being in the range of from about 0.2% to about 1.0% by weight of bentonite clay and dry fibrous cellulosic material.

2. The electrostatic recording material of claim 1, wherein the bentonite clay is comprised of sodium bentonite.

3. The electrostatic recording material of claim 1, wherein said conductive coating is polymeric or pigment based.

4. The electrostatic recording material of claim 1, wherein the amount of conductive clay present in said fibrous matrix is in the range of from about 12% to about 20% by weight of dry fibrous cellulosic material.

* * * * *